United States Patent [19]

Ozaki et al.

[11] 4,102,421
[45] Jul. 25, 1978

[54] ELECTRONIC WEIGHING APPARATUS

[75] Inventors: Tsutomu Ozaki, Amagasaki; Kazuyoshi Enomoto, Kawachinagano, both of Japan

[73] Assignee: Kubota Ltd., Osaka, Japan

[21] Appl. No.: 757,021

[22] Filed: Jan. 5, 1977

[30] Foreign Application Priority Data

Jan. 14, 1976 [JP] Japan .................................. 51-4237

[51] Int. Cl.² ..................... G01G 23/10; G01G 23/22; G01G 3/14
[52] U.S. Cl. .................................... 177/185; 177/25; 177/210 FP; 177/DIG. 6
[58] Field of Search ................... 177/185, 210 FP, 25, 177/DIG. 3, DIG. 6

[56] References Cited

U.S. PATENT DOCUMENTS

| | | | |
|---|---|---|---|
| 3,698,493 | 10/1972 | Yamanaka et al. | 177/25 X |
| 3,921,736 | 11/1975 | Rogers | 177/210 FP X |
| 3,962,569 | 6/1976 | Loshbough et al. | 177/DIG. 3 |

FOREIGN PATENT DOCUMENTS 1,265,231  3/1972  United Kingdom ................. 177/185

*Primary Examiner*—George H. Miller, Jr.
*Attorney, Agent, or Firm*—W. G. Fasse; W. W. Roberts

[57] ABSTRACT

An electronic weighing apparatus, comprising a scale mechanism having a weighing plate for placing an article being weighed, a movable slit plate associated with the weight of said article on said weighing plate and having a series of slits equally spaced in the moving direction, a light source provided at one side of said slit plate, a photodetector provided at the other side of said slit plate opposite to said light source, whereby a pulse train is generated from said photodetector. The number of pulses in the pulse train is associated with the movement of the slit plate and thus with the weight of said article. A counter for counting the number of pulses of said pulse train for providing a weight value signal, a display register for storing the weight value signal, and a display responsive to the register for displaying the weight value in said register are employed. An addition/subtraction detecting circuit is provided for generating an addition pulse or a subtraction pulse and a minus sign signal responsive to an incremental or decremental change of said pulse train. A vibration detecting circuit is provided for detecting a sequential occurrence of an incremental pulse and a decremental pulse in the order described, and said display register is adapted to be prevented from being loaded with a new weight value signal in the counter for a predetermined time period in response to the output from said vibration detecting circuit, whereby the previous data is displayed in the display for said predetermined time period, with the result that flickering of the display is eliminated.

10 Claims, 8 Drawing Figures

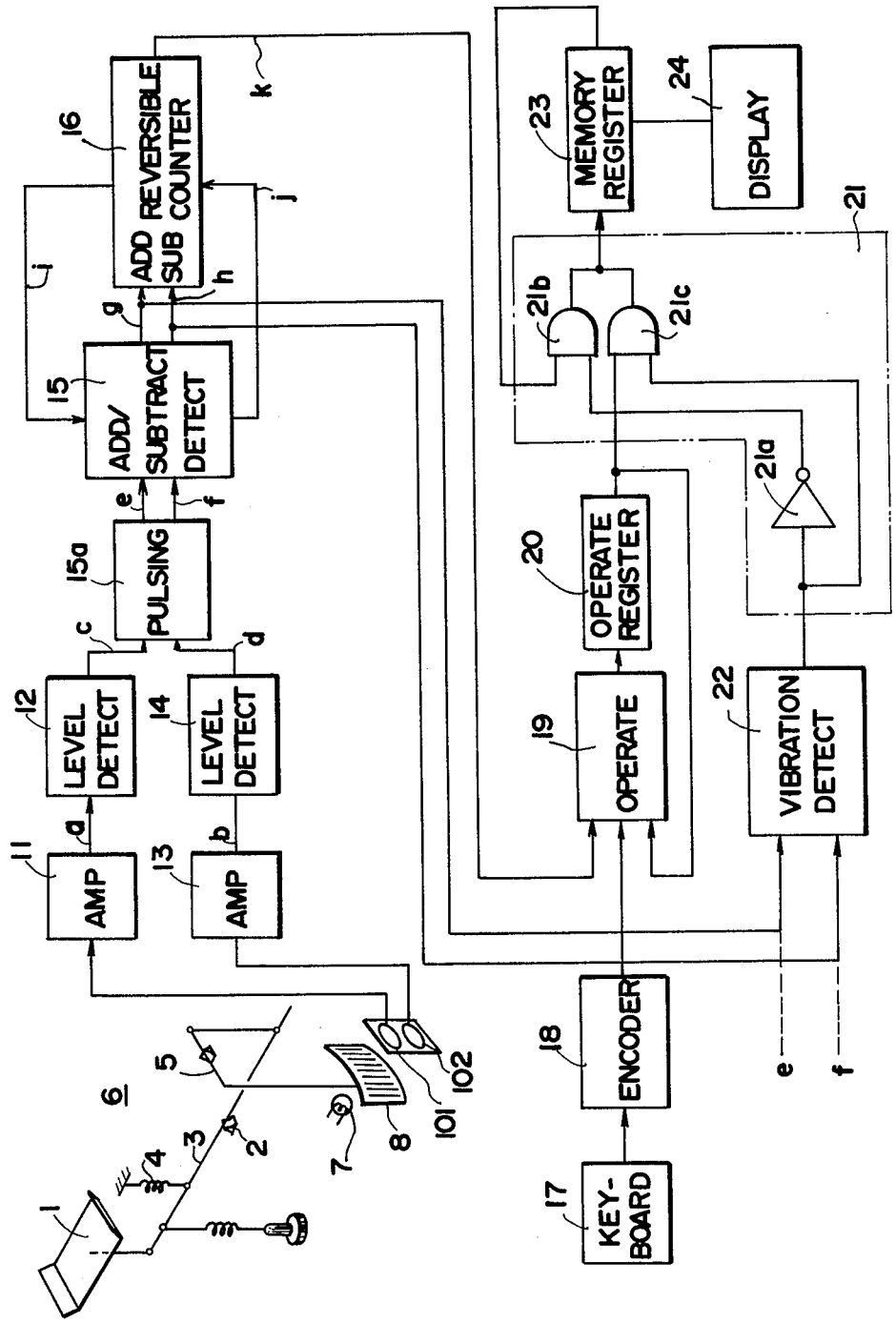

FIG.2A
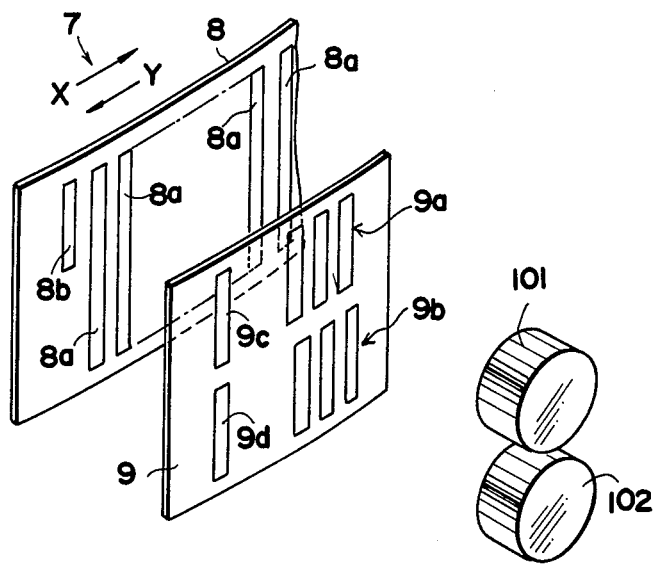
FIG.2B
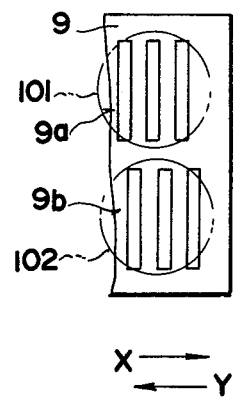
FIG.3
(a) OUTPUT a FROM AMP 11       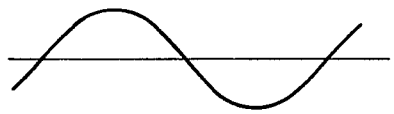
(b) OUTPUT b FROM AMP 13       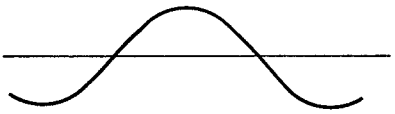
(c) OUTPUT c FROM LEVEL DETECT 12   
(d) OUTPUT d FROM LEVEL DETECT 14   
(e) OUTPUT e FROM PULSER 15a   
(f) OUTPUT f FROM PULSER 15a   

(g) ADDITION PULSE FROM 15

(h) SUBTRACTION PULSE FROM 15

($\ell$) OUTPUT $\ell$ FROM INVERTER 222

(m) OUTPUT m FROM INVERTER 224

(n) OUTPUT n FROM AND GATE 227

(o) OUTPUT o FROM VIBRATION DETECTING CIRCUIT 24

ELECTRONIC WEIGHING APPARATUS

BACKGROUND OF THE INVENTION

1. Field of the Invention

The present invention relates to an electronic weighing apparatus. More specifically, the present invention relates to an apparatus that is adapted for displaying in a digital manner the measured weight of an article and a price of the article evaluated on the basis of the measured weight and a unit price preset in advance.

2. Description of the Prior Art

A conventional electronic weighing apparatus which has been put in practical use has been adapted to measure the weight of an article, evaluate the price of the article based on the measured weight and a unit price thereof set in advance, and to display such data in a digital manner, thereby to provide both the seller and the purchaser with simplicity and accuracy of viewing the display, whereby the weighing is facilitated and trust is placed in each other. Typically, such an electronic weighing apparatus comprises a scale mechanism comprising a displacement member responsive to the weight of an article being weighed for causing displacement associated with the weight of the article, a pulse generator responsive to the displacement of the displacement member for providing a pulse train a number of pulses associated with the displacement of the displacement member and thus representing the weight of the article, each pulse representing a predetermined weight, say 2 g, a counter for counting the number of pulses for evaluating the weight of the article, and a display for displaying the measured weight in a digital manner.

In measuring the weight of an article with such an electronic weighing apparatus as described above, it may happen that the weighing plate of the scale mechanism moves up and down repeatedly in an attenuated manner. As a result, the display of the weight and thus the price is observed as repetitive changes of the indicated numerals and thus looks flickering. Such flickering of the display in an electronic weighing apparatus for displaying the data in a digital manner could also be caused by the following reasons. An inherent mechanical vibration of the scale mechanism, caused by a motor installed in a show case, for example, may cause minor variations in the displacement, which in turn results in flickering of the display. Wind could also cause a small movement of the weighing plate, which again causes flickering of the display. The fact that the repetitive changes of the displayed weight value and the price or the flickering of display occurring by the above described internal and external causes, however, requires time for stabilized measurement and makes perchasers feel distrustful of the displayed data.

Various countermeasures for preventing repetitive minor changes of the displayed data or flickering of the display as described above have also been proposed. One approach is to measure time by means of clock pulses to load a new data such as a weight value at every sampling time of say 100 ms in a given time period commensurate with, for example, one operation cycle of say 0.5 second, whereby the displayed data is adapted to be kept unchanged for the above described period of 0.5 second. Another approach comprises a particular step for reading the data in a display register during a time period corresponding to, for example, an operation cycle, as programmed, whereby a new weight value is sampled and displayed for each step, with the result that the same effect is attained. A further approach is to provide an amplifying circuit with a low pass filter of a large time constant, whereby transition in displacement, i.e. transition in an electrical signal change may be eliminated. Any one of the foregoing approaches, however, has the disadvantage that a response time is prolonged. In particular, the last mentioned approach is disadvantageous in that the sensitivity of the measurement per se is reduced.

SUMMARY OF THE INVENTION

Therefore, it is a principal object of the present invention to provide an electronic weighing apparatus having a digital display adapted to eliminate flickering of the display or repetitive minor changes of the displayed data.

Another object of the present invention is to provide an electronic weighing apparatus having a digital display adapted for preventing flickering of the display or repetitive minor changes of the displayed data without causing reduction of sensitivity of measurement and a prolonged response time.

A further object of the present invention is to provide an electronic weighing apparatus having a digital display adapted for preventing flickering of the display or repetitive minor change of the displayed data with a relatively simplified circuit configuration.

Briefly described, the present invention comprises an electronic weighing apparatus, comprising; means responsive to the weight of an article being weighed for causing displacement associated with the weight of said article, means responsive to the displacement of said displacement means for providing an electrical signal associated with the displacement of said displacement means and thus with the weight of said article, means responsive to said electrical signal for converting said electrical signal into a data signal associated with the weight of said article, means for storing said weight associated data signal, means responsive to said data store means for displaying said data associated with the weight of said article, characterized in that said apparatus further comprises means operatively coupled to said displacement means for detecting an incremental or decremental direction of displacement of said displacement means, and means responsive to said direction detecting means for tentatively preventing the weight associated data signal from being loaded into said data store means from said signal converting means upon detection of incremental direction of displacement.

The other objects, features, advantages, and aspects of the present invention will be more apparent from the following detailed description when taken in conjunction with the accompanying drawings.

BRIEF DESCRIPTION OF THE DRAWINGS

FIG. 1 is a block diagram of a weighing system a one embodiment of the present invention;

FIGS. 2A and 2B are enlarged views of portions of the weighing system shown in FIG. 1;

FIG. 3 shows wave forms of electrical signals at various portions in the FIG. 1 diagram for use in explaining of the operation of the FIG. 1 embodiment, wherein the abscissa has been adapted to correspond with the displacement amount (angle) of a slit plate 8;

DESCRIPTION OF THE PREFERRED EMBODIMENTS

Figure 4:
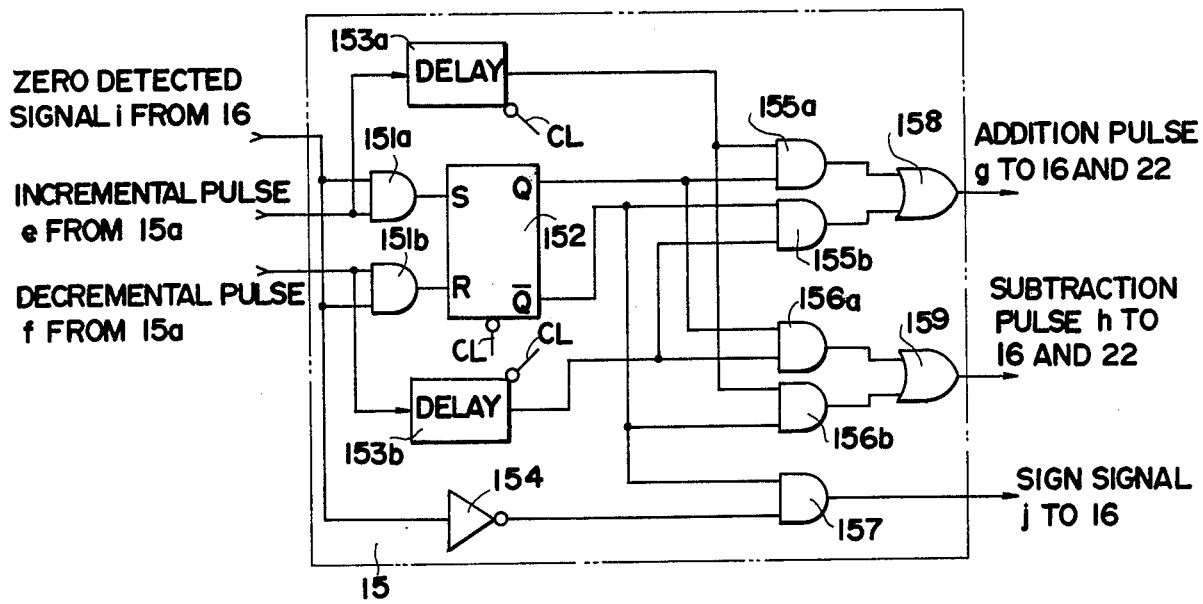
FIG. 4 is a detailed block diagram of an increment/decrement detecting circuit 15 used in the FIG. 1 diagram.

Referring to FIG. 1, the present weighing mechanism 6 comprises a weighing plate 1 for placing thereon an article being measured (not shown), an arm 3 coupled to said weighing plate 1, and a knife edge 2 for bearing the arm 3. With the edge of the knife edge 2 as a supportng point, one side of the arm 3 is urged upwardly by a spring 4, while the opposite end of the arm 3 is coupled to one end of a lever 5. The lever 5 is also supported by means of another knife edge with the edge thereof as a supporting point. The opposite end of the lever 5 is coupled to a slit plate 8.

Referring to FIG. 2A, the slit plate 8 is formed of a plurality of slits 8a, 8a, . . . , equally spaced and extending in the vertical direction. The slit plate 8 is further formed of an additional slit 8b for use in zero point detection which is as long as one half of the above described slit 8a, 8a, . . . , extending in the vertical direction and equally spaced from the left side of the group of the slits 8a, 8a, . . . , as viewed in FIG. 2A. A light source 7 is provided at the rear surface side of the slit plate 8 to emit light toward the slit plate 8 and another stationary slit plate 9 is provided at the front surface side of the slit plate 8, so that the light beam from the light source 7 is directed through the slit plates 8 and 9 in the direction perpendicular to the plates 8 and 9. The slit plate 8 may be made of a transparent glass plate, coated with an opaque material with the slit portions 8a, 8a, . . . , and 8b left uncoated so as to form transparent slits. Alternatively, the slit and made, for example, 8 may be an opaque plate of metal formed of elongated apertures 8a, 8a, . . . , and 8b.

The slit plate 9 comprises two groups of slits 9a and 9b, positioned in the upper and lower half portions of the slit plate 9, each slit being as wide as twice the width of the slits 8a and 8b formed in the slit plate 8 and extending in parallel with the slits 8a and 8b of the plate 8. The positional relation of the upper group of the slits 9a and the lower group of the slits 9b is selected such that the upper slits 9a are shifted by a pitch corresponding to a quarter of one cycle of the slit arrangement with respect to the lower slits 9b in the horizontal direction, as shown in FIGS. 2A and 2B. The shifted arrangement of the upper and the lower slits 9a and 9b is aimed to detect the direction of the movement of the weighing plate 1 of the scale mechanism 6. The slit plate 9 is further formed of additional slits 9c and 9d for zero point detection spaced apart leftward from the groups of the slits 9a and 9b side by side, respectively, by a given distance. The slits 9c and 9d are formed in substantially the same position in the horizontal direction. The slit plate 9 may also be a metallic opaque plate, for example, of aluminum formed with elongated apertures 9a, 9b, 9c and 9d.

Two photodetectors 101 and 102 are provided at the front side of the plate 9 so as to receive the light beam transmitted by the light source through the slit plates 8 and 9. More specifically, the photodetector 101 is positioned so as to face the group of slits 9a, while the photodetector 102 is positioned so as to face the group of slits 9b, as shown in FIG. 2B. On the hand, other two further photodetectors (not shown) are positioned so as to face the slits 9c and 9d, respectively, for the purpose of zero point detection.

Referring again to FIG. 1, the outputs from the photodetectors 101 and 102 are coupled to the corresponding amplifier 11 and 13, respectively. The outputs $a$ and $b$ from the amplifiers 11 and 13 are fed to level detectors 12 and 14, respectively, each comprising a Schmitt triggering circuit or the like. Each of these level detectors 12 and 14 is adapted to be responsive to each output from the corresponding photodetector 101 or 102 to detect the output at a predetermined threshold level to provide a rectangle wave output. The outputs $c$ and $d$ of the rectangle wave forms from these level detectors 12 and 14 are both coupled to a pulsing circuit 15a comprising a differentiating circuit, for example. The pulsing circuit 15a is structured to be responsive to the respective outputs $c$ and $d$ to generate differentiated pulses at the rise and fall portions of the respective outputs $c$ and $d$, thereby to selectively provide incremental pulses $e$ or decremental pulses $f$ in accordance with an incremental (downward) or decremental (upward) movement of the weighing plate of the scale mechanism 6. The incremental pulses $e$ and the decremental pulses $f$ are applied to the inputs of an addition/subtraction detecting circuit 15. The addition/subtraction detecting circuit 15 is adapted to be responsive to the outputs from the pulsing circuit 15a to detect the direction of the movement, i.e. an incremental or a decremental direction, of the weighing plate 1 of the scale mechanism 6, thereby to detect addition or subtraction to be carried out in a reversible counter 16 and to provide a corresponding addition or subtraction pulse train $g$ or $h$ and a minus sign signal $j$, to be more fully described below. The addition pulse $g$ or the subtraction pulse $h$ obtained from the addition/subtraction detecting circuit 15 is applied to an up count mode input ADD or a down count mode input SUB, respectively, of the reversible counter 16 for counting the number of pulses of the pulse train to provide a weight value in a digital manner. The output $k$ from the reversible counter 16 comprising a coded signal representative of the measured weight value of the article is then applied to the input to an operation circuit 19. The addition/subtraction detecting circuit 15 is also adapted to receive a zero detected output $i$ from the reversible counter 16 and to provide a minus sign signal $j$ representative of the minus sign (−) of the data in the counter 16.

The operation circuit 19 is also adapted to receive a unit price signal from an encoder 18, which is coupled to a key board 17. The key board 17 comprises at least ten numeral keys for the numerals 0, 1, 2, 3 . . . 9, so that any numerical value for a desired unit price may be entered. The encoder 18 is structured to encode the entered numerical value into a coded unit price signal in the manner well known to those skilled in the art. The operation circuit 19 is structured to multiply the set unit price by the measured weight value, i.e. the set unit price X the measured weight value, to evaluate the price of the article, which is applied through an operation register 20 to one input of an AND gate 21c included in a gate circuit 21. The output from the operation register 20 is also applied to one input of the operation circuit 19. The output from the AND gate 21c and the output from another AND gate 21b are together applied to the input of a display memory register 23 in a wired OR manner. The output from the display memory register 23 is applied to one input of the above described AND gate 21b and is also applied to the input of a display 24 which may comprise a display decoder, a display driver, a display tube, and the like, as is well known to those skilled in the art.

On the other hand, the addition pulse g and the subtraction pulse h from the addition/subtraction detecting circuit 15 are applied to the inputs of a vibration detecting circuit 22 for detecting vibration of the weighing plate in the upward and downward direction in the scale mechanism 6. The output from the vibration detecting circuit 22 is directly applied to the other input to the AND gate 21c and through an inverter 21a to the other input of the AND gate 21b.

Before a detailed description is made of the embodiment shown, the operation of the scale mechanism 6 will first be described with reference to FIGS. 2A, 2B and 3.

If and when an article being weighed (not shown) is placed on the weighing plate 1 of the scale mechanism 6, the arm 3 is rotated counter-clockwise as viewed in FIG. 1 with the edge of the knife edge 2 as a supporting point, as the spring 6 extends in responds to the weight of the article. The arm 3 continues to rock about the supporting point, as the rocking transient diminishes until the arm 3 becomes stabilized when the urging force of the spring caused by the weight of the article and the force of restitution of the spring becomes balanced. The upward displacement of the opposite end of the arm 3 causes the lever 5 to be rotated about the supporting point at the center thereof counter-clockwise as viewed in FIG. 1, which in turn causes the slit plate 8 arranged between the light source 7 and the photodetectors 101 and 102 to be displaced in the rightward direction as viewed in FIG. 1, which corresponds to an X arrow direction shown in FIG. 2B, and vice versa.

As the slit plate 8 is moved, the slits 8a, 8a, ... in the slit plate 8 permit the light beam from the light source 7 to be transmitted therethrough to the photodetectors 101 and 102 intermittently. As a result, the photodetectors 101 and 102 facing the upper and lower groups of the slits 9a and 9b, respectively, of the slit plate 9 generate such sine wave or sinusoidal output signals of the wave forms (a) and (b) in FIG. 3, respectively. It is understood that the output from one photodetector 102 and thus the output (b) from the amplifier 13 is out of phase or delayed in quadrature or 90° with respect to the output from the other photodetector 101 and thus the output (a) from the amplifier 11. The reason is that the slits 9a of the upper slit group and the slits 9b of the lower slit group of the slit plate 9 provided opposite to the photodetectors 101 and 102, respectively, have been displaced relative to each other by the pitch corresponding to a quarter of one cycle of the slits in the horizontal direction, which makes the timing relation of the light beam reaching the photodetectors 101 and 102 through the slit plates 8 and 9 be out of phase in quadrature or by a quarter of one cycle.

The slit plate 8 is moved in the X arrow direction or in the Y arrow direction, as the weighing plate 1 of the scale mechanism 6 is moved in the downward direction or the upward direction, respectively, and thus the relative relation of the output signals from the respective photodetectors 101 and 102 is reversed in both situations. The reason why the phase is shifted in quadrature as described above is that the direction of the movement of the weighing plate is to be detected by means of the pulsing circuit 15a and thus the addition/subtraction detecting circuit 15 to determine the addition mode or the subtraction mode in terms of the weight by means of the reversible counter 16. The outputs a and b from the amplifiers 11 and 13 are fed to the level detectors 12 and 14, respectively. If and when the threshold values of these level detectors 12 and 14 are set to the zero level with respect to the outputs from the amplifiers 11 and 13, the rectangle wave forms c and d shown in FIG. 3 (c) and (d) are obtained from the level detectors 12 and 14, respectively.

Although not shown in detail, the pulsing circuit 15a is adapted to differentiate the rise and fall portions of the respective outputs c and d of the level detectors 12 and 14 by means of, for example, two differentiating circuits. Assuming that the slit plate 8 is moving in the X arrow direction, detection is made that the output d is the low level at the rise timing of the output c and the output c is the high level at the rise timing of the output d, whereas the output d is the high level at the fall timing of the output c and the output c is the low level at the fall timing of the output d, whereupon the incremental direction is judged and the pulse output from the two differentiating circuit is adapted to be applied to one input of the addition/subtraction detecting circuit 15 by way of an incremental pulse train e, as shown in FIG. 3(e). Conversely, if and when the slit plate 8 is moving in the Y arrow direction, detection is made that the mutual relation of the outputs c and d is directly opposite to the above described case, whereupon the decremental direction is judged and the pulse output from said two differentiating circuits is applied to the other input of the addition/subtraction detecting circuit 15 by way of a decremental pulse train f, as shown in FIG. 3(f).

FIG. 4 is a block diagram showing in detail the addition/subtraction detecting circuit 15. With reference to FIG. 4, it will now be described how the state of addition or subtraction is determined. The incremental pulse output e from the pulsing circuit 15a is applied to one input of an AND gate 151a and is also applied to the input of a delay circuit 153a for the purpose of keeping the circuit operation synchronized. The decremental pulse output f from the pulsing circuit 15a is applied to one input of an AND gate 151b and is also applied to the input of a delay circuit 153b also for the purpose of keeping the circuit operation synchronized. The output from the AND gate 151a is applied to the set input S of a flip-flop 152 and the output from the AND gate 151b is applied to the reset input R of the flip-flop 152. The flip-flop 152 is triggered with the clock pulse CL and the set output Q of the flip-flop 152 is applied to one input each AND gate 155a and 156a, while the reset output $\bar{Q}$ is applied to one input of each AND gate 155b and 156b and to one input of an AND gate 157. The delay circuit 153a is triggered with the clock pulse CL and the output therefrom is applied to the other inputs of the AND gates 155a and 156b. The delay circuit 153b is similarly triggered by the clock pulse CL and the output therefrom is applied to the other inputs of the AND gates 155b and 156a. The outputs from these AND gates 155a and 155b are applied through an OR gate 158 to the reversible counter 16 and to the vibration detecting circuit 22 by way of an addition pulse g, while the outputs from these AND gates 156a and 156b are applied through an OR gate 159 to the reversible counter 16 and the vibration detecting circuit 22 by way of a subtraction pulse h. The zero detected signal i obtainable when the contents in the reversible counter 16 are zero, is applied to the other inputs of the AND gates 151a and 151b and is also applied, through an invertor 154, to the other input to the AND gate 157. The output from the AND gate 157 is applied to the reversible counter 16 by way of the minus sign signal j.

Now consider a case where the count value in the reversible counter 16, i.e. the measured weight value, is zero. In such a situation the zero detected signal i is the high level and accordingly the AND gate 151a and 151b are enabled. Now assuming that the slit plate 8 of the scale mechanism 6 moves in the X arrow direction and an incremental directional pulse as shown in FIG. 3(e) is obtained from the pulsing circuit 15a, the flip-flop 152 is set in synchronism with the clock pulse CL and the set output Q assumes the high level, while the reset output $\overline{Q}$ assumes the low level. Therefore, the AND gates 155a and 156a are enabled. At the same time, the pulse output is obtained from the delay circuit 153a in synchronism with the clock pulse CL. Accordingly, an addition pulse g is obtained from the AND gate 155a and thus from the OR gate 158. The addition pulse g is not shown in the drawing but is the same as the increment directional pulse shown in FIG. 3(e). Since the AND gate 157 has been disabled with the reset output $\overline{Q}$ of the flip-flop 152 at that time, the sign signal j remains at the low level.

Now assuming that the slit plate 8 of the scale mechanism 6 moves in the Y arrow direction if and when the measured weight value is zero and a decrement directional pulse f as shown in FIG. 3(f) is obtained from the pulsing circuit 15a, the flip-flop 152 is reset in synchronism with the clock pulse CL and the set output Q of the flip-flop 152 assumes the low level, while the reset output $\overline{Q}$ of the flip-flop 152 assumes the high level. Therefore, the AND gates 155b and 156b and 157 are enabled. At the same time, the pulse output is obtained from the delay circuit 153b in synchronism with the clock pulse CL. Accordingly, the addition pulse g is obtained from the AND gate 155b and thus from the OR gate 158. Since the AND gate 157 has been enabled with the reset output $\overline{Q}$ of the flip-flop 152 in such a situation, the sign signal j assumes the high level, which indicates that the addition pulse g should be added in the negative direction.

Now consider a case where the count value in the reversible counter 16, i.e. the measured weight value is not zero (W $\neq$ 0). In such a situation the zero detected signal i is at the low level and accordingly the AND gates 151a and 151b are disabled. Now assuming that the slit plate 8 of the scale mechanism 6 moves in the X arrow direction and the increment directional pulse e as shown in FIG. 3(e) is obtained from the pulsing circuit 15a, the addition pulse g is obtained from the AND gate 155a and thus from the OR gate 158 if and when the flip-flop 152 has been set, whereas the subtraction pulse h is obtained from the AND gate 156a and thus from the OR gate 159 if and when the flip-flop 152 has been reset. On the other hand, assuming that the slit plate 8 of the scale mechanism 6 moves in the Y arrow direction in such situation where the measured weight value is not zero, i.e. W $\neq$ 0 and the decrement directional pulse f as shown in FIG. 3(f) is obtained from the pulsing circuit 15a, the addition pulse g is obtained from the AND gate 155a and thus from the OR gate 158 if and when the flip-flop 152 has been set, whereas the substraction pulse h is obtained from the AND gate 156b and thus from the OR gate 159 if and when the flip-flop 152 has been reset. It will be readily understood that in such a situation the sign signal j assumes the high level only if and when the zero detected signal i is at the high level and the decrement directional pulse f is received. Thus, the addition pulse g and the subtraction pulse h and the sign (−) signal j are obtained from the addition/subtraction detecting circuit 15.

The addition or subtraction pulse train g or h from the addition/subtraction detecting circuit 15 is applied to the up count input ADD or to the down count input SUB of the reversible counter 16 in such a manner that each pulse represents a predetermined unit weight. Therefore, the count value in the reversible counter 16 represents the weight of an article placed on the weighing plate 1 of the scale mechanism 6, which has a sign of plus or minus. The count value or the weight value signal k in the reversible counter 16 is applied to the operation circuit 19, as described above.

The operation circuit 19 multiplies the unit price set in advance by means of the key board 17, by the measured weight value obtained as described previously, thereby to evaluate the price of the article being weighed. Therefore, the AND gate 21c included in the gate circuit 21 is supplied with the price signal representing the price of the article being weighed, which is applied to the display memory register 23 and is displayed by means of the display circuit 24.

Now assuming that the scale mechanism 6 has given rise to a mechanical vibration, the measured weight value in the reversible counter 16 is liable to fluctuate. It will be appreciated that fluctuation of the price which is obtained by multiplication of the unit price by the above described fluctuating weight value could be appreciably large. Such fluctuation of the displayed price makes the customer feel distrustful of the weighing apparatus. In addition, a longer time is required for weighing an article. Hence, the embodiment shown is aimed to make the display invariable for a given period in response to mechanical vibration of the scale mechanism 6.

Figure 5:
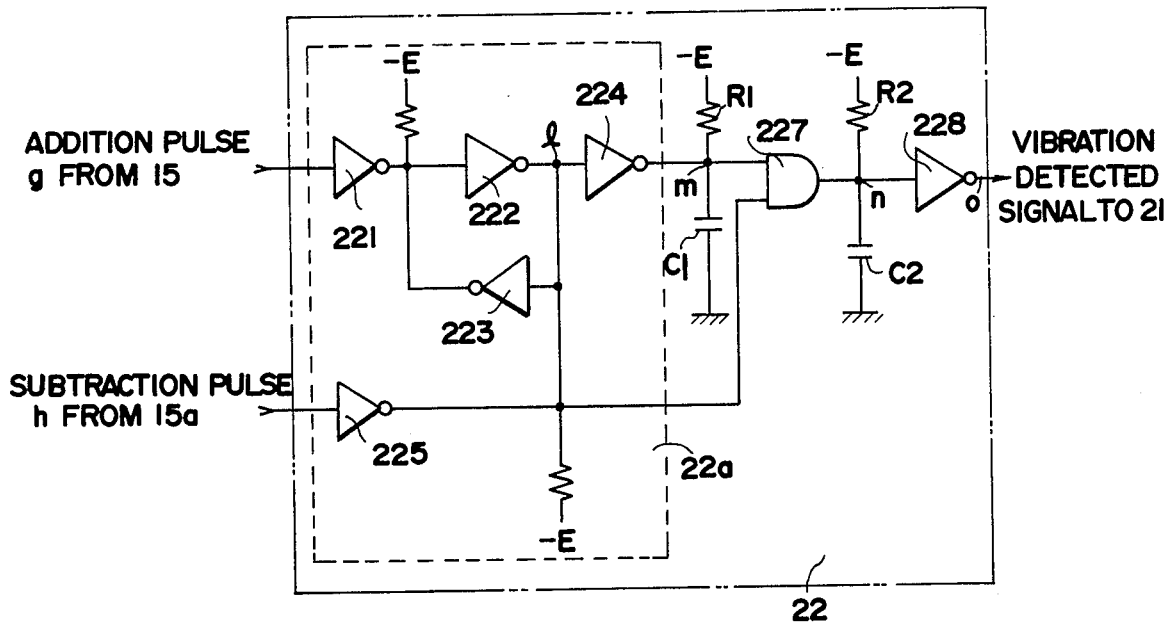
FIG. 5 is a detailed block diagram of a vibration detecting circuit 22 used in the FIG. 1 diagram.

Referring to FIG. 5, the vibration detecting circuit 22 will now be described. The addition pulse g from the addition/subtraction detecting circuit 15a is applied as an input to an inverter 221. The output from the inverter 221 is connected through a suitable resister to a negative voltage source −E and is also connected to the input of an inverter 222 and the output of an inverter 223. The subtraction pulse h from the addition/subtraction detecting circuit 15a is applied to an input of an inverter 225. The output from the inverter 225 is connected to the output from the inverter 222 and to the input by the respective inverters 224 and 223 and to one input to an AND gate 227. The output from the inverter 224 is connected to the other input of the AND gate 227. The junction between the invertor 224 and the AND gate 227 is grounded through a capacitor C1 and is also connected through a resistor R1 to the negative voltage source −E. The output from the AND gate 227 is connected to an input of an inverter 228. The junction between the AND gate 227 and the inverter 228 is grounded through a capacitor C2 and is also connected through a resistor R2 to the negative voltage source −E. The output from the inverter 228 is withdrawn by way of the output from the vibration detecting circuit 22. The above described inverters 221, 222, 223, 224 and 225 constitute a single flip-flop 22a. Accordingly, these inverters 221 through 225 may be replaced by an alternative different flip-flop, in which event the input to the inverter 221 corresponds to a set input, the input to the inverter 225 corresponds to a reset input, the output from the inverter 224 corresponds to a reset output, and the output from the inverter 225 corresponds to a set output.

Now consider a case where the addition pulse g is received. In this situation, it is assumed that the addition pulse g is a negative logic pulse, as shown in FIG. 6(g). Therefore, the output l from the inverter 222 is kept at the low level until the timing T1, as shown in FIG. 6(l) by means of the inverters 222 and 223, and accordingly the output m from the inverter 224 is kept at the high level, as shown in FIG. 6(m). On the other hand, the subtraction pulse h remains at the high level, as shown in FIG. 6(h), and accordingly the output from the inverter 225 is at the low level. Accordingly, the output n from the AND gate 227 remains at the low level until the time T1, as shown in FIG. 6(n). Therefore, the output from the inverter 228, i.e. the output o from the vibration detecting circuit 222 is at the high level until the time T1, as shown in FIG. 6(o). Thus, if and when the output o from the vibration detecting circuit 22 is at the high level, one input to the AND gate 21b, namely the output from the invertor 21a in the gate circuit 21 in FIG. 1, is at the low level and one input to the AND gate 21c is at the high level. Therefore, during the time period up to the time T1, the price of the article thus measured by means of the operation circuit 19 is stored through the AND gate 21c in the display memory register 23. Accordingly, the price thus obtained is displayed from time to time by means of the display circuit 24.

Now consider a case where the subtraction pulse h is received following the addition pulse g. It is assumed that the subtraction pulse h is also a negative logic pulse, as shown in FIG. 6(h). Therefore, the output l from the inverter 222 is kept at the high level from the timing T1 to the timing T2. Accordingly, the output m from the inverter 224 becomes smaller than a predetermined threshold value Vth1 after the lapse of a given time period td1, as shown in FIG. 6(m). This is achieved because of the discharge through the RC circuit comprising the capacitor C1 and the resister R1. The above described time period td1 is expressed in the following equation (1):

$$td1 = C1 \cdot R1 \cdot l_n \frac{E}{E - Vth1} \qquad (1)$$

The threshold value Vth1 is the input threshold value for the AND gate 227, which has been determined such that the AND gate 227 responds to the input signal as if it were the low level if and when the input signal is smaller than the threshold value Vth1. Thus, the output n from the AND gate 227 continues to charge the capacitor C2 after the subtraction pulse h is received until the time period td1 lapses, as shown in FIG. 6(n). Thereafter the capacitor C2 is discharged through the register R2. Therefore, the output n from the AND gate 227 becomes smaller than the threshold value Vth2 after the lapse of a given time period td2. The time period td2 is expressed in the following equation (2):

$$td2 = C2 \cdot R2 \cdot l_n \frac{E}{E - Vth2} \qquad (2)$$

The threshold value Vth2 is the input threshold value of the following inverter 228, which has been selected such that the inverter 228 responds to the input signal as if it were at the low level if and when the input signal is smaller than the threshold value Vth2. Therefore, the output o from the inverter 228 and thus from the vibration detecting circuit 22 assumes the low level during the time periods td1 and td2, i.e. during a time period td1 + td2. Since the output o from the vibration detecting circuit 22 is at the low level, one input of the AND gate 21b shown in FIG. 1 assumes the high level and one input of the AND gate 21c assumes the low level. Therefore, during the time period td1 + td2, the AND gate 21b is enabled and the AND gate 21c is disabled. Accordingly, during said time period, the memory register 23 is not supplied with a new price signal from the operation circuit 19, with the result that the memory register 23 keep storing the preceding data. Accordingly, during the time period td1 and td2, however many addition pulse g or subtraction pulse h had been applied to the reversible counter 16, whereby a new weight value had been evaluated in the counter 16 and a new price had been evaluated in the operation circuit 19, the resultant new data is not stored in the memory register 23 any more. As a result, during the time period the display circuit 24 keeps indicating the previous price. This fact eliminates any feeling of flickering in the display. In this connection, it should be pointed out that, since the price data as previously obtained and kept indicated, resembles the data subsequently obtained from time to time during the above described time period. In such a situation, display in a fixed manner of the preceding data for a little while does not make the customer feel distrustful of the weighing apparatus.

When the time period td2 lapses thereafter, the output o from the vibration detecting circuit 22 assumes the high level, with the result that the memory register 23 is loaded again from time to time with new varying data. Thus, the display circuit 24 displays the data in a real time manner.

Figure 6:
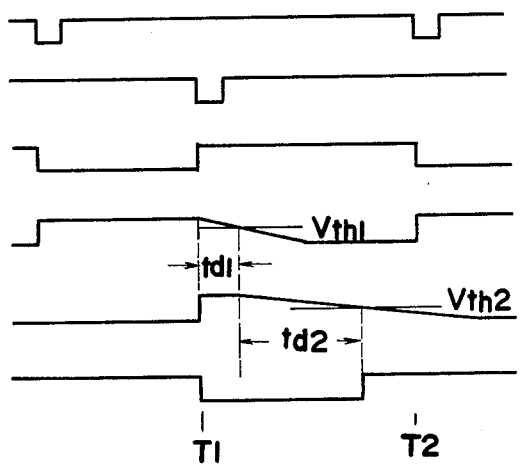
FIG. 6 shows wave forms of electrical signals at various portions of the vibration detecting circuit 22 used shown in FIG. 5.

More specifically, assuming that the addition pulse g is received, as shown in FIG. 6, to reach the measured weight value of 100g, a new weight value of 98g is attained by the subtraction pulse h and then a further new weight value of 100g is obtained by the addition pulse. Accordingly, with the apparatus of the invention, the weight value of 98g during the time period when the subtraction pulse is received is adapted not to be displayed during the time period td1 + td2 when the vibration detected signal is obtained, whereupon the weight value of 100g after the vibration detected signal O has disappeared, is displayed. As a result, no flickering phenomenon is observed in the display. If and when no further pulse is applied after the subtraction pulse h is received, the weight value of 98g is displayed after the lapse of the time period td1 + td2.

The above described time period td1 + td2 is preferably selected such that it is shorter than two times the measurement response time including that of the mechanical structure of the scale mechanism 6, i.e. a time period after the scale mechanism starts to move until the unit counting pulse is obtained. If the above described time period td1 + td2 is selected as described above, the displayed weight value or price does not give rise to a difference exceeding one counting pulse for the reversible counter which operates with the repetitive addition pulse or subtraction pulse.

The range of the magnitude of vibration to which the vibration detecting circuit is responsive can be adjusted by selection of the time constants determined by the capacitors C1 and C2 and the resisters R1 and R2. To that end, the resistors R1 and R2 may be variable resistors, so that such range can be set with ease so as to match the balancing state of the scale mechanism.

The vibration detecting circuit 22 to be employed in the present invention may be used in any type of an electronic weighing apparatus wherein the amount of mechanical displacement is converted to an electrical signal such as a pulse train the number of which is associated with the displacement amount, wherein an analog voltage signal the voltage of which is associated with the displacement amount or the like, and wherein the measured weight value is displayed in a digital manner.

Figure 7:
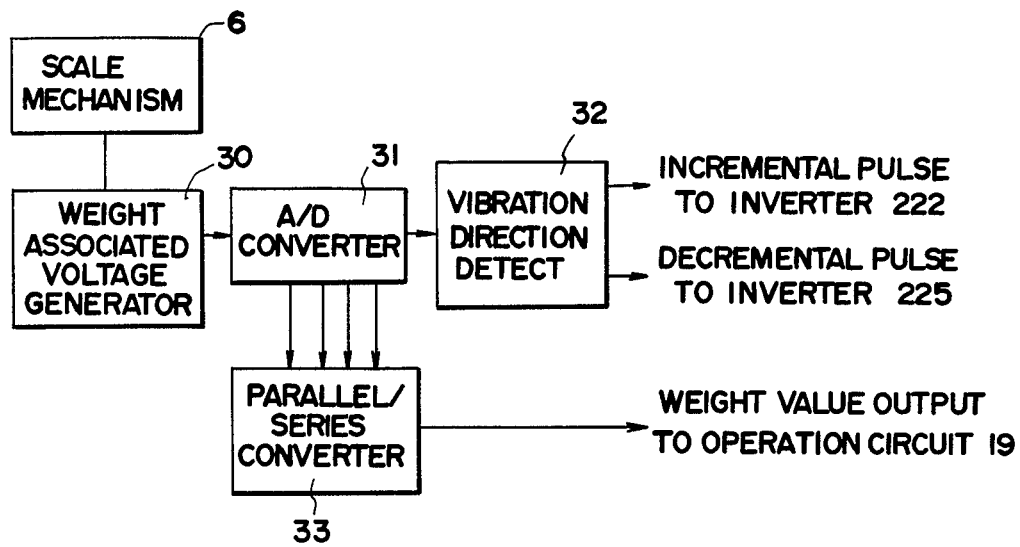
FIG. 7 is a block diagram of another embodiment of the present invention.

FIG. 7 shows an example of an electronic weighing apparatus wherein the amount of mechanical displacement is converted into an analog voltage signal the voltage value of which is associated with the displacement amount. More specifically, the amount of displacement of the displacement member displaceable in response to the weight of an article placed on the weighing plate of the scale mechanism 6' is converted to a voltage value associated with the displacement amount by means of a weight associated voltage generator 30. The weight associated voltage thus obtained is applied to an analog/digital convertor 31 where the weight associated voltage is converted to a digital weight value signal represented by, for example, BCD, which is then applied to a parallel/series converter 33. The series coded output from the parallel/series converter 33 is applied to the operation circuit 19 shown in FIG. 1 by way of a weight value signal. The operation circuit 19 makes a multiplying operation of the unit price by the weight value to evaluate the price of the article being measured.

The output from the analog/digital converter 31 is also applied to a weight variation direction detecting circuit 32. The weight variation direction detecting circuit 32 is structured to detect the direction of the mechanical displacement in the scale mechanism 6', i.e. whether the displacement is in an incremental direction or a decremental direction, based on the variation of the weight value signal in an analog or digital form. The weight variation direction detecting circuit 32 provides a pulse signal representative of the incremental direction which is not shown but is similar to the above described incremental pulse e, if and when the displacement is in the incremental direction, and provides a pulse signal representative of the decremental direction, which is not shown but is similar to the above described decremental pulse f, if and when the displacement is in the decremental direction. The incremental direction pulse or the decremental direction pulse is applied to one or the other input to the above described vibration detecting circuit 22. The vibration detecting circuit 22 detects repetitive vibration of the displacement member in the scale mechanism 6' to make the display by the display circuit 24 constant for a given time period. A flickering phenomenon observed in the display is thus prevented.

It is pointed out that two inputs to the vibration detecting circuit 22 may be adapted to receive the incremental pulse e or a decremental pulse f from the pulsing circuit 15a shown in FIG. 1 to perform the same operation.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. An electronic weighing apparatus, comprising: means responsive to the weight of an article being weighed for causing a displacement associated with the weight of said article, means responsive to the displacement of said displacement means for providing an electrical signal representing the displacement of said displacement means and thus the weight of said article, means operatively coupled to said electrical signal providing means for storing said weight associated electrical signal, means responsive to said electrical signal storing means for displaying the weight of said article, vibration detecting means operatively coupled to said electrical signal providing means for detecting an undesired vibration of said displacement means, means operatively coupled to said storing means and to said vibration detecting means and responsive to the output from said vibration detecting means for preventing said weight representing electrical signal from being stored in said storing means for a predetermined time period, said electrical signal providing means comprising pulse generating means responsive to the displacement of said displacement means for generating a pulse train having a number of pulses representative of the displacement of said displacement means, counter means operatively coupled to said pulse generating means for counting the number of pulses in said pulse train, said displacement means being adapted to cause displacement in a first direction in response to a relative increase in the weight of the article and to cause displacement in a second direction in response to a relative decrease in the weight of the article, said pulse generating means being adapted to generate a first pulse train responsive to the displacement of said displacement means in said first direction and to generate a second pulse train responsive to the displacement of said displacement means in the second direction, said vibration detecting means comprising signal output means responsive to sequential generation of said first pulse train and to said second pulse train in the stated order for providing a vibration representing output for a predetermined time period, said signal output means comprising storing means assuming a first state in response to said first pulse train and assuming a second state in response to said second pulse train, delay means coupled to said storing means for delaying one state output of said storing means for a predetermined time period, and means coupled to said delay means and the other output of said storing means for providing a logical product of the output from said delay means and the other output of said storing means.

2. The electronic weighing apparatus of claim 1, wherein said delay means comprises a time constant circuit.

3. The electronic weighing apparatus of claim 1, wherein said electrical signal providing means comprises a code means movable in response to the displacement of said displacement means and having a machine readable coded area for coding the weight of the article being weighed, means operatively coupled to said movable code means for reading the coded signal representing the weight of said article in said code area.

4. The electronic weighing apparatus of claim 1, wherein said preventing means comprises means operatively coupled to said vibration detecting means and to said electrical signal providing means for applying a logical product output of the output from said vibration detecting means and the output from said electrical signal providing means, to the input of said storing means.

5. The electronic weighing apparatus of claim 1, wherein said electrical signal providing means comprises means responsive to the displacement of said displacement means for providing an analog voltage signal representing the displacement of said displacement means and thus the weight of said article.

6. The electronic weighing apparatus of claim 5, wherein said vibration detecting means is adapted to provide a vibration detected output for a predetermined time period if and when the magnitude of the change in said analog voltage signal per unit of time exceeds a predetermined value.

7. The electronic weighing apparatus of claim 1, further comprising means operatively coupled to said preventing means for keeping said storing means storing the stored electrical signal when said preventing means prevents said storing means from being loaded with an electrical signal.

8. The electronic weighing apparatus of claim 7, wherein said keeping means comprises means responsive to the output from said vibration detecting means and to said electrical signal stored in said storing means for providing a logical product output of said output from said vibration detecting means and said electrical signal stored in said storing means, to the input to said storing means.

9. The electronic weighing apparatus of claim 1, further comprising means for setting data relating to the unit price of said article, means for effecting a multiplying operation of said weight of said article by said set unit price of said article for evaluating the price of said article, and display means responsive to said price evaluating means for displaying said price of said article.

10. The electronic weighing apparatus of claim 9, wherein said preventing means is adapted to prevent said storing means from being loaded with a data signal representative of said price of said article.

* * * * *